Nov. 2, 1954 — R. A. ATTON — 2,693,049
FISHING LINE FLOAT
Filed Aug. 12, 1949
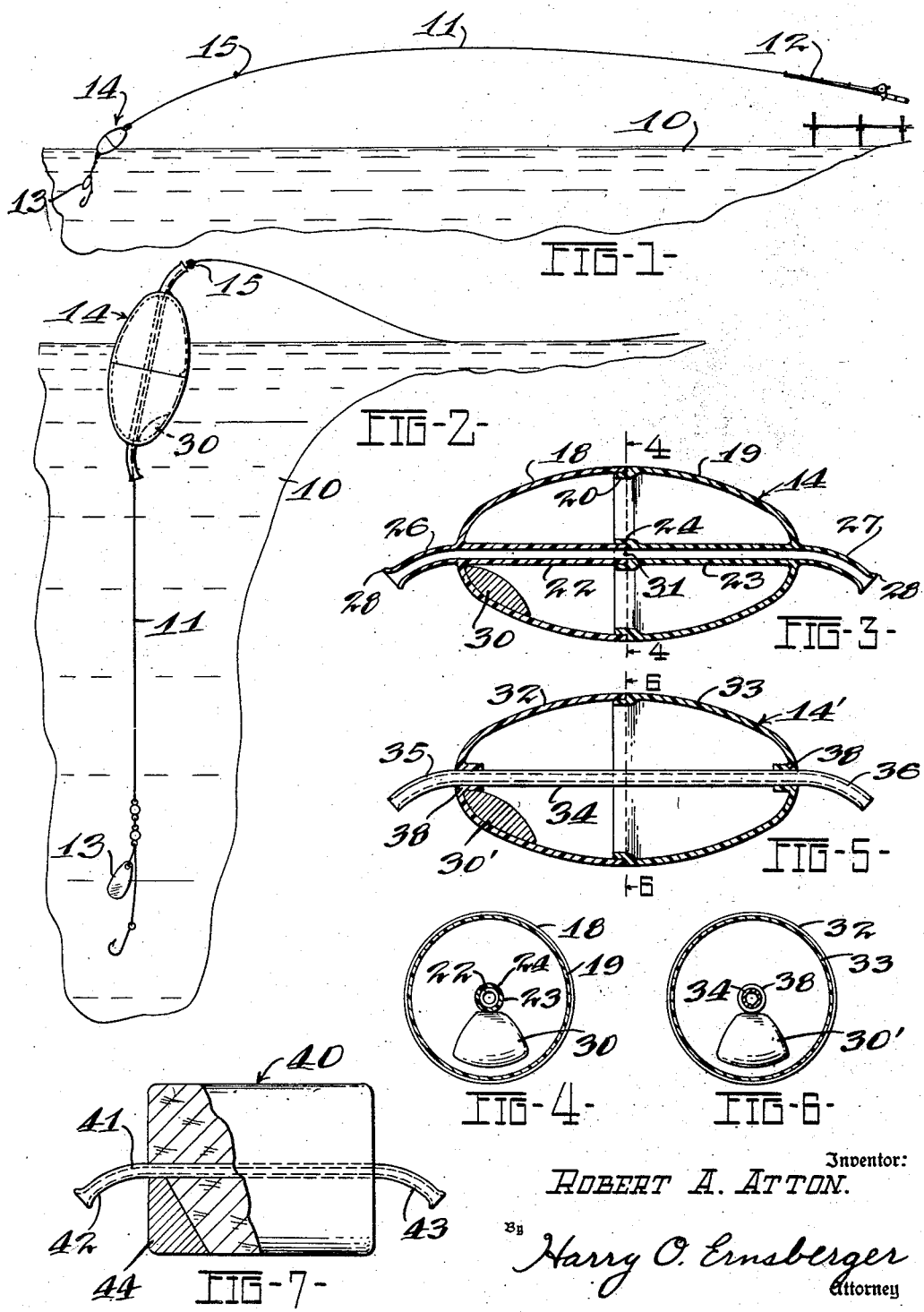
Inventor:
ROBERT A. ATTON.
By Harry O. Ernsberger
Attorney

United States Patent Office 2,693,049
Patented Nov. 2, 1954

2,693,049

FISHING LINE FLOAT

Robert A. Atton, Toledo, Ohio

Application August 12, 1949, Serial No. 109,991

1 Claim. (Cl. 43—44.9)

This invention relates to floats for fishing lines and more especially to a float which is arranged for slidable movement along a fishing line.

The invention embraces the provision of a float arranged for relative slidable movement along a fishing line in which the float is provided with a suitable guide for the line, the float being of a character readily adapted to be cast into the water simultaneously with the casting of a fishing lure.

An object of the invention resides in the provision of a float or bobber slidably carried on a fishing line and which is weighted eccentrically in a manner to cause the float to assume a predetermined position of buoyancy in the water.

Another object of the invention resides in the provision of a float of elongated shape having a tube or passage therethrough to receive a fishing line, the entrance and exit of the tube or passage being curved to provide a desired angle for the lure in descending into the water and to enhance the movement of the fishing line through the passage or tube.

A further object of the invention resides in the provision of a float or bobber of a character readily adaptable to be manufactured or molded of resinous or plastic material in which the tubular channel to receive the fishing line may, if desired, be integrally formed with the float proper.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of forms of the invention, which may be preferred, in which:

Figure 1 is a semi-diagrammatic view illustrating a relative position of a float embodying my invention at the instant that it strikes the water during a lure casting operation;

Figure 2 is a view illustrating the position of the float when the lure has descended to a predetermined position beneath the surface of the water;

Figure 3 is a longitudinal sectional view showing one form of float of my invention;

Figure 4 is a vertical sectional view through the float, the section being taken substantially on the line 4—4 of Figure 3;

Figure 5 is a longitudinal sectional view showing a modified form of float;

Figure 6 is a transverse sectional view taken substantially on the line 6—6 of Figure 5, and Figure 7 is an elevational view partly in section illustrating a further modification of float construction of my invention.

Referring to the drawings in detail and first with respect to Figures 1 and 2, a body of water is illustrated at 10, a fishing line 11, a fishing rod 12, a fish lure 13 and a float 14, the construction of the latter constituting a form of my invention. In Figure 1 the float 14 which has been cast from the rod 12 simultaneously with the fish lure 13 is illustrated in the position it assumes at the time of striking the surface of the water 10. It is sometimes desirable to limit the depth at which the lure may descend in the water and one means of limiting the depth is to affix or tie a knot 15 in the line which engages an element of the float in a manner illustrated in Figure 2. Figure 2 also illustrates the approximate angular position that the float assumes after the lure 13 has descended to the depth permitted by the knot or impediment 15 associated with the fishing line 11.

One form of the float 14 of my invention is illustrated in Figures 3 and 4. This form of float is preferably made in two hollow semi-ovaloid bottom and top sections or elements 18 and 19 respectively, the wall of the element 19 preferably overlapping the element 18 as indicated at 20. The juncture at the overlapping portions may be sealed by plastic cement and other suitable waterproof bonding medium. The float 14 of Figure 3 is hollow and has comparatively thin walls so as to augment the buoyancy of the float.

Formed along the central axes of the float sections 18 and 19 are tubular portions 22 and 23, the ends of which partially overlap or telescope as at 24, and the juncture sealed by suitable waterproof bonding agent or cementitious material. As illustrated in Figure 3 the portions 22 and 23 extend exteriorly of the float proper in the form of extensions or projections 26 and 27. The extensions 26 and 27 are curved in the same general direction and the arcs defined by the curved extensions lie in the same plane. The extremities of the projections 26 and 27 are slightly flared outwardly as indicated at 28 to facilitate the entrance and passage of a fishing or casting line through the tubular configuration provided by elements 22, 23, 26 and 27 and minimize wear of the line. The section 18 including the tubular formation 22 and 26 may be molded of suitable resin or plastic material into a single unit, and likewise, the section 19 and tubular components 23 and 27 may be molded of resin or plastic material. The use of resin or plastic material is particularly desirable as it may be readily molded to the desired shape and is substantially waterproof so that no further water proofing process is necessary after the sealing of the joints 20 and 24. While there are several synthetic resins or plastics that will fulfill the requirements for a satisfactory float, I have found that a resin such as cellulose acetate butyrate provides a satisfactory material for the float. The curved extensions 26 and 27 facilitate the movement of the fishing line 11 through the float as the curved portions approximate the normal angle of fishing line at the instant the float strikes the water as illustrated in Figure 1.

Secured to the float 14 near the forward end thereof is a weight or mass of metal or other relatively heavy material 30. The weight is fixedly secured to the wall of the float section 18 by bonding, cementing or other suitable means. It is to be noted that the center of mass of the weight 30 is eccentric or out of center with respect to the longitudinal axis of the tubular sections 22 and 23 and is spaced from the geometric center 31 of the float 14. The weight has its center of gravity in the same plane as the arcs defined by said curved portions. The weight 30 provides added weight associated with the float to facilitate and enhance the casting of the float simultaneously with the fishing lure. It also places the center of gravity to one side of the longitudinal axis of the float so as to result in a stable direction of flight of the float during casting operations, so that the float impinges upon the water with the weighted end striking first, thus placing the curvatures of the extensions 26 and 27 in proper position with respect to the fishing line so as to facilitate movement of the line through the float when the lure is descending in the water. The weight performs the further function of providing for a desired angular position of the float in the water when the lure has reached its lowermost position, the angularity of the float with respect to the surface of the body of water being particularly illustrated in Figure 2.

Figures 5 and 6 illustrate another form of float construction 14' composed of thin-walled semi-ovaloid sections 32 and 33 which are molded of suitable resin or plastic in the same manner as the form shown in Figure 3. A weight 30' is secured within one end of the float by the use of cementitious material or other suitable means. In this form of the invention, an independent tubular member 34 extends through the float having curved portions 35 and 36 projecting from each end of the float which are generally of the shape of the corresponding extensions 26 and 27 illustrated in Figure 3. Suitable tight joints are effected as indicated at 38 between the end walls of sections 32 and 33 and the tube 34 so as to prevent the ingress of water into the interior of the float shell 14'. The extensions 35 and 36 of the tube member 34 are curved to a configuration similar to that of projections 26 and 27. In this form of the invention the tube 34 may be formed of metal having non-corrosive characteristics such as copper, chromium bearing steel, Monel metal or the like.

Figure 7 illustrates another form of float embodying the principles of my invention, the float 40 being formed of cork or other light weight or low density material. The float is of elongated cylindrical configuration, a tube member 41 passing through an opening extending longitudinally of the float. The tube is formed with curved entrance and exit portions 42 and 43 as illustrated in Figure 7 to facilitate the slidable passage of a fishing line. A suitable weight 44 is affixed in one end of the float 40, the center of mass of the weight being offset from the longitudinal axis of the float and spaced from the geometric center of the float. As in the other forms of the invention, the weight 44 will perform the functions of enhancing the casting of the float, of stabilizing the position of the float at the time it strikes the water and imparting the desired angular position to the float when the lure has descended to its predetermined depth as shown in Figure 2.

While I have illustrated forms of my invention as made from plastic or resinous material or cork, it is to be understood that the float may be made of other materials having the necessary buoyancy characteristics of weight or shape without departing from the spirit of the invention.

It is apparent that, within the scope of the invention, modifications and different arrangements may be made other than are herein disclosed, and the present disclosure is illustrative merely, the invention comprehending all variations thereof.

What I claim is:

A fishing float comprising a hollow body having top and bottom sections, a tube adapted to receive a fishing line therethrough, said tube connected to and passing through said body and protruding through the apexes of said top and bottom sections, that portion of said tube encompassed by said body being straight and coaxially aligned with the longitudinal axis of said body, the protruding portions of said tube being curved in the same direction and having the arcs defined by said curved portions lying in the same plane, and a fixed weight in said bottom section adjacent the forward end thereof and adjacent said tube and having its center of gravity on the same side of the longitudinal axis of said body as the curved portions, and in the same plane as the arcs defined by said curved portions.

References Cited in the file of this patent

UNITED STATES PATENTS

| Number | Name | Date |
|---|---|---|
| 943,506 | Wooton | Dec. 14, 1909 |
| 1,316,040 | Jamison | Sept. 16, 1919 |
| 1,801,729 | Elliott | Apr. 21, 1931 |
| 1,982,573 | Coyne | Nov. 27, 1934 |
| 2,181,254 | Wilson | Nov. 28, 1939 |
| 2,230,456 | Henze | Feb. 4, 1941 |
| 2,275,076 | Haynes | Mar. 3, 1942 |
| 2,444,791 | Stahnke | July 6, 1948 |
| 2,492,033 | Cherriere | Dec. 20, 1949 |

FOREIGN PATENTS

| Number | Country | Date |
|---|---|---|
| 360,282 | France | Feb. 17, 1906 |
| 677,900 | France | Dec. 19, 1929 |